United States Patent
Miller

(10) Patent No.: US 10,432,603 B2
(45) Date of Patent: *Oct. 1, 2019

(54) ACCESS TO DOCUMENTS IN A DOCUMENT MANAGEMENT AND COLLABORATION SYSTEM

(71) Applicant: Amazon Technologies, Inc., Seattle, WA (US)

(72) Inventor: Jonathan Matthew Miller, Burke, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,100

(22) Filed: Oct. 30, 2017

(65) Prior Publication Data

US 2018/0063115 A1    Mar. 1, 2018

Related U.S. Application Data

(63) Continuation of application No. 14/499,699, filed on Sep. 29, 2014, now Pat. No. 9,807,073.

(51) Int. Cl.
*G06F 21/62* (2013.01)
*H04L 29/06* (2006.01)

(52) U.S. Cl.
CPC .......... *H04L 63/08* (2013.01); *G06F 21/6218* (2013.01); *H04L 63/18* (2013.01)

(58) Field of Classification Search
CPC ...... H04L 63/08; H04L 63/18; G06F 21/6218
(Continued)

(56) References Cited

U.S. PATENT DOCUMENTS 5,251,315 A    10/1993 Wang
5,577,188 A    11/1996 Zhu
(Continued)

FOREIGN PATENT DOCUMENTS

JP    H10240220 A    9/1998
JP    2003067330 A    3/2003
(Continued)

OTHER PUBLICATIONS

Australian Notice of Acceptance for Patent Application dated Nov. 17, 2017, Patent Application No. 2014346473, filed Nov. 10, 2014, 3 pages.
(Continued)

*Primary Examiner* — Kambiz Zand
*Assistant Examiner* — Aubrey H Wyszynski
(74) *Attorney, Agent, or Firm* — Davis Wright Tremaine LLP

(57) ABSTRACT

A method and apparatus for securing access to a document stored by a document management and collaboration system are disclosed. In the method and apparatus, access credentials pertaining to a document are obtained, whereby the access credentials are usable for authenticating a request to access the document. A message including the access credentials is then sent out-of-band in relation to a notification indicating availability of the document for access. The document management and collaboration system then receives a request to access the document, whereby the request includes the access credentials, and authenticates the request based at least in part on the access credentials.

20 Claims, 9 Drawing Sheets

(58) Field of Classification Search
USPC .......................................................... 726/7
See application file for complete search history.

(56) References Cited

U.S. PATENT DOCUMENTS

| | | | |
|---|---|---|---|
| 5,596,754 | A | 1/1997 | Lomet |
| 5,832,470 | A | 11/1998 | Morita et al. |
| 5,878,398 | A | 3/1999 | Tokuda et al. |
| 5,991,713 | A | 11/1999 | Unger et al. |
| 6,314,425 | B1 | 11/2001 | Serbinis et al. |
| 6,397,205 | B1 | 5/2002 | Juola |
| 6,442,555 | B1 | 8/2002 | Shmueli et al. |
| 6,505,195 | B1 | 1/2003 | Ikeda et al. |
| 6,553,365 | B1 | 4/2003 | Summerlin et al. |
| 6,687,876 | B1 | 2/2004 | Schilit et al. |
| 6,687,878 | B1 | 2/2004 | Eintracht et al. |
| 6,725,239 | B2 | 4/2004 | Sherman et al. |
| 6,763,346 | B1 | 7/2004 | Nishida et al. |
| 7,177,886 | B2 | 2/2007 | Pruet, III |
| 7,882,110 | B2 | 2/2011 | Bahr |
| 8,429,753 | B2 | 4/2013 | Skaria et al. |
| 8,527,461 | B2 | 9/2013 | Ducott, III et al. |
| 8,655,950 | B2 | 2/2014 | Scherpa et al. |
| 8,825,502 | B2 | 9/2014 | Bormann et al. |
| 8,843,494 | B1 | 9/2014 | Sampson |
| 8,938,669 | B1 | 1/2015 | Cohen |
| 9,020,893 | B2 | 4/2015 | Zalpuri et al. |
| 9,047,368 | B1 | 6/2015 | Cooley |
| 9,106,687 | B1 | 8/2015 | Sawhney et al. |
| 2001/0042085 | A1 | 11/2001 | Peairs et al. |
| 2002/0138529 | A1 | 9/2002 | Yang-Stephens et al. |
| 2003/0061221 | A1 | 3/2003 | Ito et al. |
| 2004/0068697 | A1 | 4/2004 | Harik et al. |
| 2004/0205542 | A1 | 10/2004 | Bargeron et al. |
| 2004/0210833 | A1 | 10/2004 | Lerner et al. |
| 2004/0230577 | A1 | 11/2004 | Kawatani |
| 2004/0267746 | A1 | 12/2004 | Marcjan et al. |
| 2005/0010799 | A1 | 1/2005 | Kelley et al. |
| 2005/0022106 | A1 | 1/2005 | Kawai et al. |
| 2005/0034062 | A1 | 2/2005 | Bufkin et al. |
| 2005/0038787 | A1 | 2/2005 | Cheung et al. |
| 2005/0044494 | A1 | 2/2005 | Barnes et al. |
| 2005/0055306 | A1 | 3/2005 | Miller et al. |
| 2005/0160356 | A1 | 7/2005 | Albornoz et al. |
| 2005/0240580 | A1* | 10/2005 | Zamir ............... G06F 17/30867 |
| 2005/0251675 | A1 | 11/2005 | Marcjan et al. |
| 2006/0053365 | A1 | 3/2006 | Hollander et al. |
| 2006/0125846 | A1 | 6/2006 | Springer et al. |
| 2006/0150079 | A1 | 7/2006 | Albornoz et al. |
| 2006/0183462 | A1* | 8/2006 | Kolehmainen .......... H04B 5/00 455/411 |
| 2006/0248083 | A1 | 11/2006 | Sack et al. |
| 2006/0294311 | A1 | 12/2006 | Fu et al. |
| 2007/0118795 | A1 | 5/2007 | Noyes et al. |
| 2007/0156732 | A1 | 7/2007 | Surendran et al. |
| 2007/0208994 | A1 | 9/2007 | Reddel et al. |
| 2007/0271249 | A1 | 11/2007 | Cragun et al. |
| 2008/0040342 | A1 | 2/2008 | Hust et al. |
| 2008/0052291 | A1 | 2/2008 | Bender |
| 2008/0222512 | A1 | 9/2008 | Albornoz et al. |
| 2009/0217158 | A1 | 8/2009 | Bailey |
| 2009/0260060 | A1 | 10/2009 | Smith et al. |
| 2009/0265747 | A1* | 10/2009 | Li ........................ G06F 21/10 725/109 |
| 2010/0010998 | A1 | 1/2010 | Wagner |
| 2010/0030578 | A1 | 2/2010 | Siddique et al. |
| 2010/0095203 | A1 | 4/2010 | Toebes et al. |
| 2010/0174983 | A1 | 7/2010 | Levy et al. |
| 2010/0211781 | A1 | 8/2010 | Auradkar et al. |
| 2010/0241668 | A1 | 9/2010 | Susanto et al. |
| 2010/0318893 | A1 | 12/2010 | Matthews et al. |
| 2010/0325686 | A1 | 12/2010 | Davis et al. |
| 2011/0055180 | A1 | 3/2011 | Lumley et al. |
| 2011/0078615 | A1 | 3/2011 | Bier |
| 2011/0088091 | A1 | 4/2011 | Petronijevic et al. |
| 2011/0099152 | A1 | 4/2011 | Law et al. |
| 2011/0145593 | A1 | 6/2011 | Auradkar et al. |
| 2011/0153680 | A1 | 6/2011 | Rolla et al. |
| 2011/0178981 | A1 | 7/2011 | Bowen et al. |
| 2011/0197266 | A1 | 8/2011 | Chu et al. |
| 2011/0231222 | A1 | 9/2011 | Sharma et al. |
| 2011/0289105 | A1 | 11/2011 | Hershowitz |
| 2011/0296517 | A1 | 12/2011 | Grigoriev et al. |
| 2011/0302210 | A1 | 12/2011 | Comanescu |
| 2011/0320925 | A1 | 12/2011 | Piersol et al. |
| 2012/0030553 | A1 | 2/2012 | Delpha et al. |
| 2012/0136936 | A1 | 5/2012 | Quintuna |
| 2012/0192086 | A1 | 7/2012 | Ghods et al. |
| 2012/0222132 | A1 | 8/2012 | Burger et al. |
| 2012/0284605 | A1 | 11/2012 | Sitrick et al. |
| 2012/0323968 | A1 | 12/2012 | Yih et al. |
| 2013/0013560 | A1 | 1/2013 | Goldberg et al. |
| 2013/0061125 | A1 | 3/2013 | O'Mara et al. |
| 2013/0104028 | A1 | 4/2013 | Murray et al. |
| 2013/0151970 | A1 | 6/2013 | Achour |
| 2013/0191451 | A1 | 7/2013 | Tse et al. |
| 2013/0219176 | A1 | 8/2013 | Akella et al. |
| 2013/0246901 | A1 | 9/2013 | Massand |
| 2013/0311420 | A1 | 11/2013 | Tehranchi et al. |
| 2014/0026025 | A1 | 1/2014 | Smith |
| 2014/0089775 | A1 | 3/2014 | Worsley et al. |
| 2014/0101310 | A1 | 4/2014 | Savage et al. |
| 2014/0115436 | A1 | 4/2014 | Beaver et al. |
| 2014/0115450 | A1 | 4/2014 | Zhong et al. |
| 2014/0196115 | A1 | 7/2014 | Pelykh |
| 2014/0229556 | A1 | 8/2014 | Cooper et al. |
| 2014/0250073 | A1 | 9/2014 | Zalpuri et al. |
| 2014/0281875 | A1 | 9/2014 | Branton et al. |
| 2014/0282921 | A1* | 9/2014 | Filman .................. G06F 9/468 726/5 |
| 2014/0351907 | A1 | 11/2014 | Noble |
| 2015/0067150 | A1 | 3/2015 | Heredia et al. |
| 2015/0106378 | A1 | 4/2015 | Clark et al. |
| 2015/0134600 | A1 | 5/2015 | Eisner et al. |
| 2015/0169500 | A1 | 6/2015 | Balinsky et al. |

FOREIGN PATENT DOCUMENTS

| | | |
|---|---|---|
| JP | 2005228253 A | 8/2005 |
| JP | 2007501969 A | 2/2007 |
| JP | 2009086742 A | 4/2009 |
| JP | 2010034920 A | 2/2010 |
| JP | 2011191862 | 9/2011 |
| JP | 2012209809 A | 10/2012 |
| KR | 20100080802 A | 7/2010 |
| KR | 20110000655 A | 1/2011 |
| KR | 101159504 B1 | 6/2012 |
| KR | 20140092831 A | 7/2014 |
| WO | 2009105735 A2 | 8/2009 |

OTHER PUBLICATIONS

Eppstein et al., "What's the Difference? Efficient Set Reconciliation Without Prior Context?", SIGCOMM '11, Aug. 15-19, 2011, 12 pages.

Extended European Search Report, dated Oct. 27, 2017, European Patent Application No. 14859862.6, filed Nov. 10, 2014, 12 pages.

International Search Report and Written Opinion dated Aug. 28, 2015, International Patent Application No. PCT/US2015/014911, filed Feb. 6, 2015.

International Search Report and Written Opinion dated Mar. 31, 2015, International Patent Application No. PCT/US2014/064875, filed Nov. 10, 2014.

Japanese Final Rejection dated Mar. 26, 2018, Patent Application No. 2016-528236, filed Nov. 10, 2014, 4 pages.

Kong et al., "Graphical Overlays: Using Layered Elements to Aid Chart Reading," IEEE Transactions on Visualization and Computer Graphics 18(21): 2631-2638, published online Oct. 9, 2012, print publication Dec. 1, 2012.

Korean Decision of Patent Grant dated Oct. 2, 2017, Patent Application No. 10-2016-7015415, filed Nov. 10, 2014, four pages.

(56) References Cited

OTHER PUBLICATIONS

Canadian Office Action dated Jun. 28, 2018, Patent Application No. 2930415, filed Nov. 10, 2014, 4 pages.
Doi et al., "A proposal of an Annotation System CollabSticky Focused on Collecting Comments in Presentation," Information Processing Society of Japan 2007(1):159-164, Jul. 2007.
He et al, "RIDEE-SPS: Presentation System for Realtime Interactive Distance Education Environment," Information Processing Society of Japan 44(3):700-708, Mar. 15, 2003.
Japanese First Office Action dated Oct. 15, 2018, Patent Application No. 2018-138930, filed Nov. 10, 2014, 4 pages.
Chinese First Office Action dated Dec. 3, 2018, Patent Application No. 201480072858.7, filed Nov. 10, 2014, 8 pages.
Singaporean Notice of Eligibility for Grant and Supplementary Examination Report dated Dec. 24, 2018, Patent Application No. 11201603644X, filed Nov. 10, 2014, 3 pages.
Fujita et al., "Comprehensive Manual for Editing and Publishing Books for Amazon Kindle (p. 162)," MD Corporation, Inc., Jul. 21, 2013, 4 pages.
Japanese Final Rejection dated Mar. 4, 2019, Patent Application No. 2018-138930, filed Nov. 10, 2014, 3 pages.
Japanese Office Action dated Mar. 25, 2019, Patent Application No. 2016-528236, filed Nov. 10, 2014, 17 pages.
Canadian Office Action dated Jun. 4, 2019, Patent Application No. 2930415, filed Nov. 10, 2014, 3 pages.
Chinese Second Office Action dated Jun. 18, 2019, Patent Application No. 201480072858.7, filed Nov. 10, 2014, 3 pages.
European Communication under Rule 71(3) EPC dated Jun. 7, 2019, Patent Application No. 14859862.6, filed Nov. 10, 2014, 48 pages.

\* cited by examiner

US 10,432,603 B2

ACCESS TO DOCUMENTS IN A DOCUMENT MANAGEMENT AND COLLABORATION SYSTEM

CROSS REFERENCE TO RELATED APPLICATION

This application is a continuation of U.S. patent application Ser. No. 14/499,699, filed Sep. 29, 2014, now U.S. Pat. No. 9,807,073, entitled "ACCESS TO DOCUMENTS IN A DOCUMENT MANAGEMENT AND COLLABORATION SYSTEM," the disclosure of which is hereby incorporated herein in its entirety.

BACKGROUND

The use of network-based computing and storage has proliferated in recent years. Network-based storage has enabled users and organizations alike to forego the infrastructure costs associated with establishing on-premises data storage solutions. Instead, users and organizations are increasingly migrating to network-based storage solutions. In addition to having small or negligible set-up costs, network-based storage is also advantageous in that data access is facilitated to members of an organization who may be located in various geographical locations, whereby the members may store documents in a network-based storage system and retrieve those documents as needed. In addition, access control policies may be specified for documents stored in the network-based storage system. The access control policies may be used to dictate a level of access that an organization member is granted for a document.

It is often challenging to ensure that documents stored in a network-based storage system are appropriately protected from illegitimate access. Furthermore, it is also challenging to ensure that the document remain protected after being copied to a user device.

BRIEF DESCRIPTION OF THE DRAWINGS

Various embodiments in accordance with the present disclosure will be described with reference to the drawings, in which.

DETAILED DESCRIPTION

Figure 1:
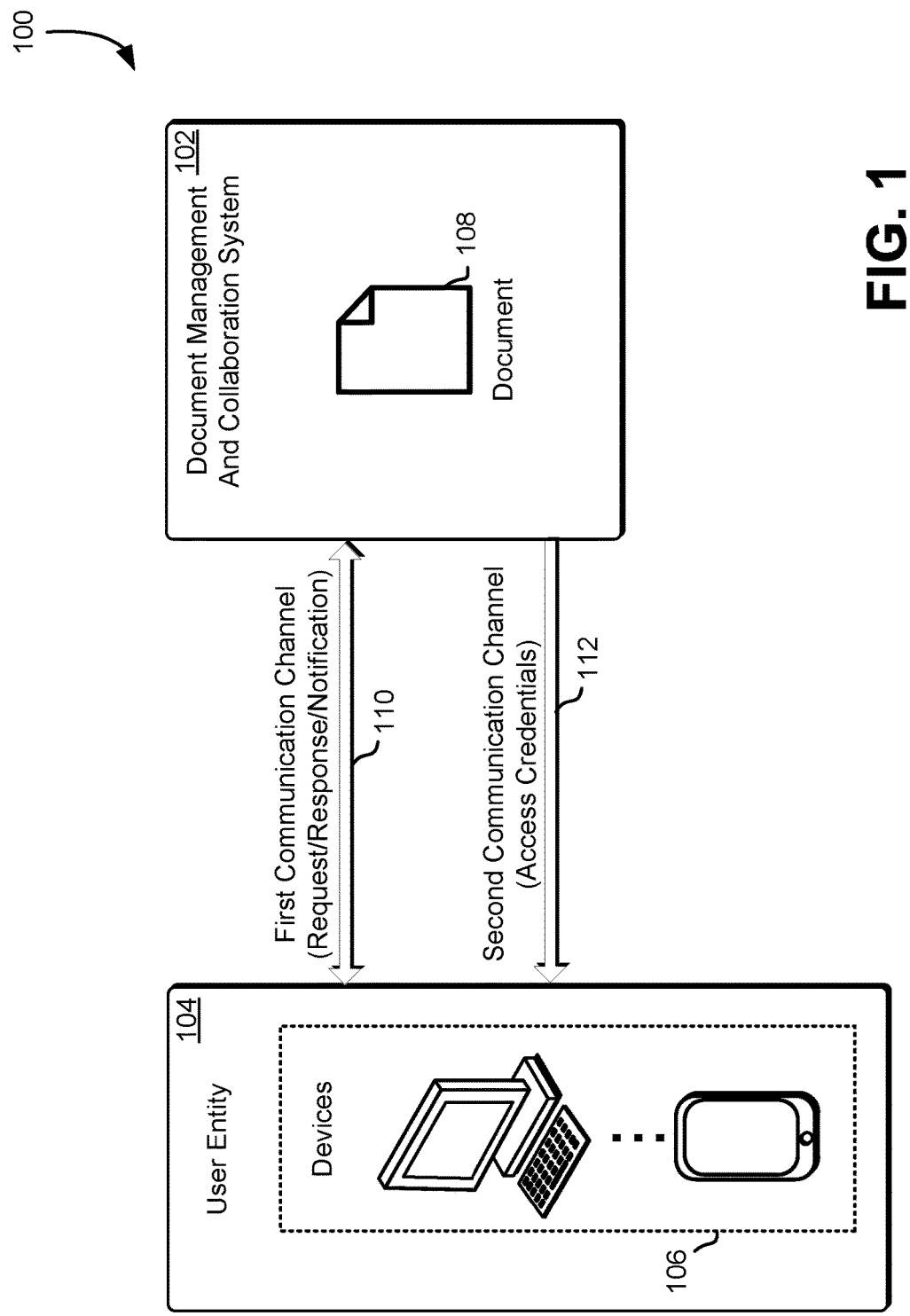
FIG. 1 shows an environment for accessing a document management and collaboration system in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include authenticating access to a document stored by a document management and collaboration system. The document management and collaboration system may permit multiple users belonging to a variety of organizations to share and collaborate on documents. The document management and collaboration system may be provided by a remote service provider, whereby access to the document management and collaboration system may be performed over a network, such as the Internet or an intranet. As described herein, a document may be any type of content, such as audio-visual media. For example, document may be a computer file that is capable of being rendered by a computer program for viewing by a user.

The document management and collaboration system may be used to remotely store documents and manage access to the document. Access to the document may include downloading a copy of the document to a user device. Further, access to the document may also include viewing or modifying the document via an interface or a portal. Access restrictions that govern the types of permitted access to the document may be put in place. For example, the access restrictions may specify that a document may be accessed by a first user if a second user having a sharing privilege over the document requests that the document is to be shared with the first user. A user is identified by the document management and collaboration system based at least in part on access credentials associated with the user, such as log-in information, that is used to access the document management and collaboration system. For certain types of access to a document, the document management and collaboration system may authenticate a request for access based at least in part on the access credentials associated with the user. For example, if a document is shared with a user, a request for viewing or modifying the document via a user interface or portal may be authenticated based at least in part on the access credentials associated with the user. Further authentication techniques may be utilized if a higher level of access to the document (such as obtaining a copy of the document for local storage at a user device) is sought.

The document management and collaboration system receives from a first user a request to share a document with a second user. The document management and collaboration system determines whether the first user is permitted to share the document. If a determination is made that the first user is permitted to share the document, the document management and collaboration system sends a notification indicating that the document has been made accessible. The notification may be sent to an address associated with the second user. For example, the notification may be an email message sent to a registered email address of the second user with the document management and collaboration system. In various embodiments, the notification may be provided to the second user via a portal upon logging in to document management and collaboration system. The document management and collaboration system may also provide access credentials usable to authenticate a request for access to the document. The access credentials may include a password, an access token, a cryptographic key or a digital certificate, among others. To ensure that the enabled access permission to the document is not compromised or illegitimately used (for example, by an attacker), the access credentials may be sent out-of-band in relation with the notification. For example, if the notification is provided in an email message addressed to an email address of the second user, the access credentials may be sent to a different email address. Further, the access credentials may be provided in a short message service (SMS) message that is sent to a phone number of the second user or a voice message to the phone number. The document management and collaboration system retains the access credentials and uses the access credentials for authenticating a received request for access to the document.

Authentication by the document management and collaboration system includes testing access credentials submitted by a party requesting access to a document. Based at least in part on the testing of the access credentials, a confidence (for example, as measured by a confidence score) that the party requesting access is the second user may be determined. The confidence may be adjusted based at least in part on the levels of authentication performed by the document management and collaboration system. In addition to authentication based at least in part on received access credentials, authentication may be based at least in part on log on information of the second user or attributes of the device used to access the document. A confidence score that the requesting party is in fact that second user may be proportional to the number of independent authentication factors that are performed. For example, the confidence score may be higher for a user authenticated based at least in part on both their log on information to the document management and collaboration system and access credentials for the document than a user that is authenticated only using the access credentials for the document. The confidence score may be used to assess a level certainty that the requesting party has the second user's identity.

Upon downloading of the document to a user device, the access credentials may also be used for authenticating a request to access the document. For example, after obtaining a copy of the document and storing the copy locally, access to the local copy may be required to be authenticated based at least in part on the credentials. A synchronization client may be executed on the user device and may be used to authenticate requests for access to the local copy of the document. The synchronization client may be part of a standard productivity application used for rendering the document or may be a proprietary application for rendering documents provided by the document management and collaboration system. The document may have associated active content, for example, in a document wrapper, and the active content may indicate that access requests for the document are to be authenticated. Upon attempting to access the document, the synchronization client may prompt a user to provide the access credentials for the document. Further, the synchronization client may cause the request to be authenticated based at least in part on the access credentials. The synchronization client may communicate with the document management and collaboration system to authenticate the request for access. If a network connection to the document management and collaboration system is not available, access to the document may be denied. The synchronization client as determined based at least in part on the active content associated with the document may also permit a user to request the access credentials to be resent or to request new access credentials be generated and sent to an address registered with the document management and collaboration system.

FIG. 1 shows an environment for accessing a document management and collaboration system in accordance with at least one embodiment. In the environment 100, a document management and collaboration system 102 and a user entity 104 including a plurality of devices 106 are shown, whereby communication between the document management and collaboration system 102 and the plurality of devices 106 may be facilitated by a network (not shown). The document management and collaboration system 102 stores a document 108 that may be accessed using a device of the plurality of devices 106, whereby a request access to the document 108 is authenticated based at least in part on access credentials associated with the document 108.

A first communication channel 110 and a second communication channel 112 are shown in FIG. 1 between the plurality of devices 106 and the document management and collaboration system 102, whereby a communication channel may be any type of link or data path between the document management and collaboration system 102 and a device. To ensure that access that are used to authenticate access to the document are securely communicated by the document management and collaboration system 102 to a user device, a separate communication channel is used for the access credentials than other types of communication between with a user device. As shown in FIG. 1, the first communication channel 110 is used for exchanging requests, responses and notifications among others between a user device and the document management and collaboration system 102. Conversely, the second communication channel 112 is used for providing access credentials, whereby the access credentials communicated over the second communication channel 112 may be used to request access to the document over the first communication channel 110. For example, the first communication channel 110 may be an transmission control protocol/Internet protocol (TCP/IP) communications link between a user device and the document management and collaboration system 102, whereby the link may be used to access a portal of the document management and collaboration system 102, receive notification of document 108 sharing and request access to the document 108. Conversely, the second communication channel 112 may be any type of link that may facilitate receipt of the access credentials. The second communication channel 112 may be a cellular communications link for receipt of the access credentials using an SMS message or a voice message.

Figure 2:
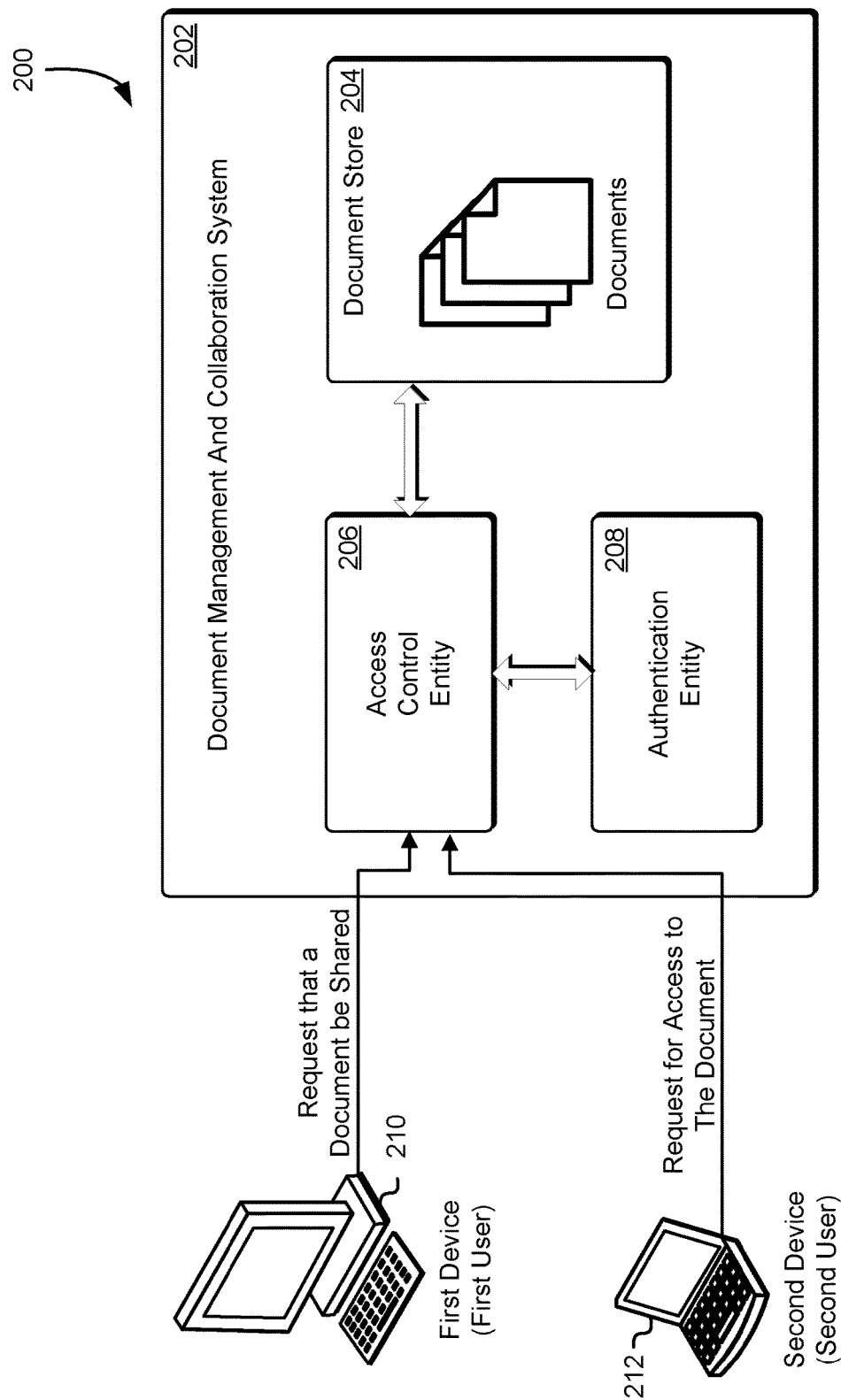
FIG. 2 shows an example of an environment for sharing a document retained by a document management and collaboration system in accordance with at least one embodiment.

FIG. 2 shows an example of an environment for sharing a document retained by a document management and collaboration system in accordance with at least one embodiment. In the environment 200, the document management and collaboration system 202 includes a document store 204, an access control entity 206 and an authentication entity 208. A first device 210 and a second device 212 communicate with the document management and collaboration system 202 over a network (not shown). The network may be a public network or a private network, whereby examples of the network include the Internet, an intranet or an Internet service provider (ISP) network.

The document management and collaboration system 202 may be a collection of computing resources that enables users to provide documents to the document management and collaboration system 202 for storage and share the documents between one another. A document may be any data object that is produced or collaborated on by users, whereby the document may be any type of media, such as audio-visual media. The document may be a computer file that is capable of being produced by or edited or viewed using a productivity program or suite. In addition, the document may be editable or non-editable text, images, drawings or websites, among others. For example, the document may be a portable document format (pdf) document that is capable of being rendered using Adobe™ Acrobat™. Further, the document may be a word processing document, for example, having a rich text format (rtf) file format or any one of the Microsoft® Office file formats, that is capable of being rendered using an application, such as Microsoft® Office or Apache OpenOffice™.

The computing resources of the document management and collaboration system 202 may include computational resources, memory resources and networking resources. One or more servers, hosts or computers, among others, may be used to provide computational resources to the document management and collaboration system 202. The one or more servers, hosts or computers may include central processing units (CPUs) or graphics processing units (GPUs), among others, that enables performing various computational operations including converting a document from a first format to a second format. For example, the document management and collaboration system 202 may be operable to use the computational resources to convert a received document from a native format in which the document was received to a common representation format, whereby all the documents that are retained by the document management and collaboration system 202 may be required to be converted and stored in the common representation format. Different productivity programs or suites may be required to view or edit the native format and the common representation format. In addition, the computational resources may be used to enable performing text extraction on text-based documents and causing the extracted text to be searchable by users for locating or identifying documents of interest.

One or more databases or storage devices may be used to provide memory resources to the document management and collaboration system 202. The memory resources enables storing documents by the document management and collaboration system 202 in various formats or retaining access privilege information for each document, whereby the access privilege information may specify a level of access that a user has to the document. For example, a user may have a level of privilege that permits the user to read or view the document, edit the document or download the document, among others.

Users of the document management and collaboration system 202 may pertain to one or more organizations, whereby an organization may be any collection of entities (for example, individuals) that have an associated organizational structure. For example, an organization may have one or more administrators that may set a policy specifying the privileges of users within the organization. The policy may, for example, dictate whether a user that is part of the organization may share a document with other users who may or may not be part of the organization. As shown in FIG. 2, the users may utilize the first device 210 and the second device 212 to communicate with the document management and collaboration system 202, whereby a user may, for example, request sharing or accessing a document.

As shown in FIG. 2, a first user of the first device 210 requests that a document be shared with a second user. The request may be made at the time the document is provided to (or uploaded) to the document management and collaboration system 202 for storage or at another time, whereby the request may be application programming interface (API) function call, among others. The request may be evaluated by an access control entity 206 of the document management and collaboration system 202. The access control entity 206 may determine whether the first user of the first device 210 is authorized to share the document with the second user. The evaluation may be dependent upon the level of the access privilege sought to be granted to the second user, whereby, the first user may be permitted to provide the second user with some access privileges, such as, an access privilege to view the document, but not other access privileges, such as an access privilege to modify or download the document. If a positive determination is made, the access control entity 206 may configure access permissions associated with the second user to indicate that the second user is to have the specified access. In addition, in response to receiving a request to upload the document from the first user, the access control entity 206 may similarly evaluate whether the access privileges of the first user permit the user to provide the document to the document management and collaboration system 202 for storage, and in response to a positive determination, the document management and collaboration system 202 may cause the document to be stored in the document store 204 of the document management and collaboration system 202.

As described herein, in response to receiving the request to share the document with the second user, the access control entity 206 or another entity may send a first message to the second user indicating that the document has been shared with the second user. Furthermore, access credentials for the document may also be provided to the second user in a second message that is out-of-band with the first message. For example, if the first message is an email message sent to a registered email address of the second user, the second message may be a separate email message that is sent to the same email address or a different registered email address, a text message sent to a registered telephone number or a voice call made to the telephone number. The access credentials may be provided by the first user and may be retained by the authentication entity 208 for use in authenticating the second user's access to the document. Furthermore, the authentication entity 208 or another entity of the document management and collaboration system 202 may generate the access credentials. After the second user is provided with the access credentials, the second user may use the second device 212 to request access to the document and may provide the access credentials with the request. The request may be authenticated by the authentication entity 208 based at least in part on the access credentials. In addition or as an alternative, the second user may be authenticated based at least in part on their log on information (for example, user name and password) to the document management and collaboration system 202 or other authentication factors. Authentication using a plurality of factors may be used to establish a level of confidence that the requesting user is in fact the user having the access privilege to the document. Furthermore, upon authentication, the access control entity 206 provides the second user with access to the document.

Figure 3:
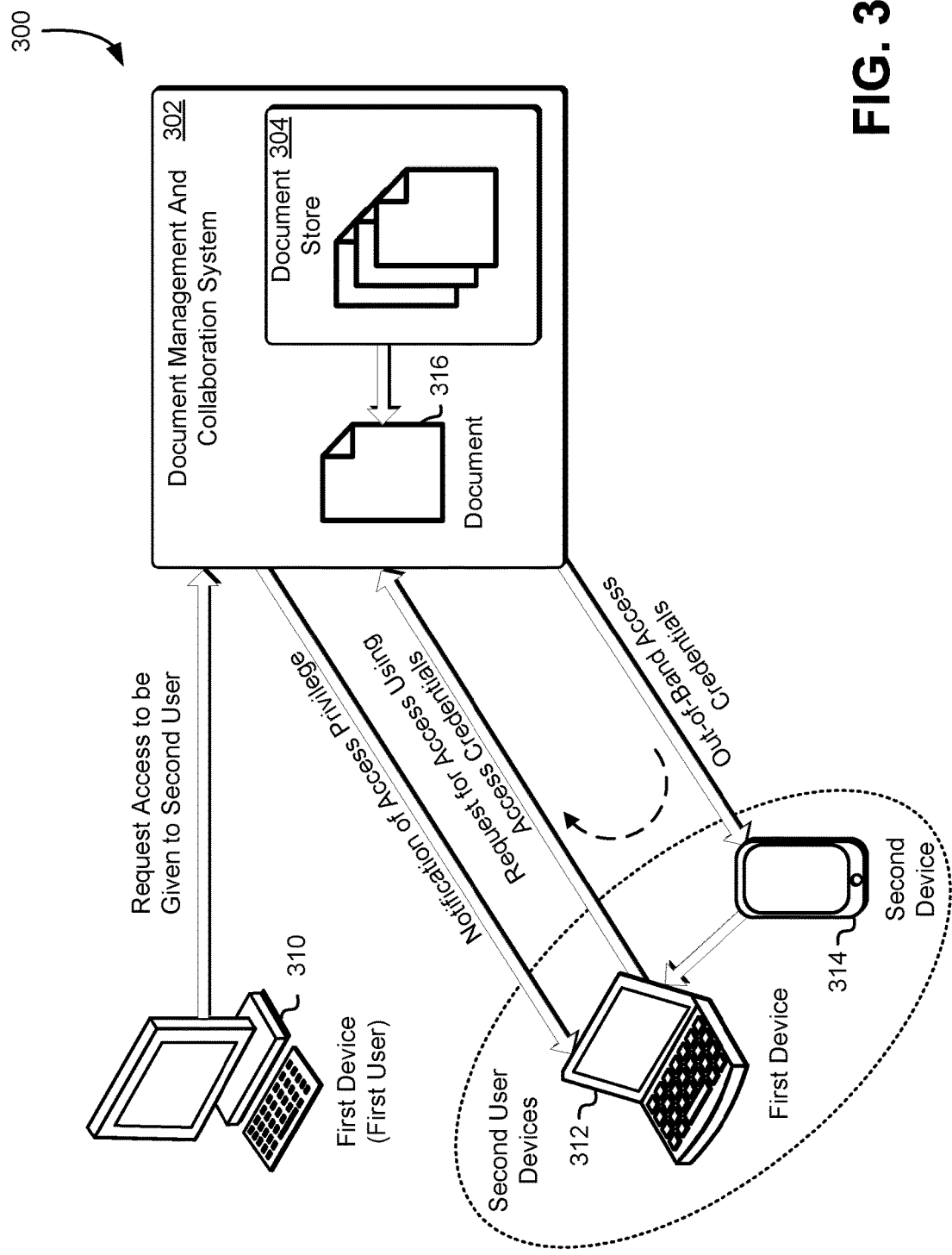
FIG. 3 shows an example of device access to a document management and collaboration system in accordance with at least one embodiment.

FIG. 3 shows an example on an environment 300 including device access to a document management and collaboration system in accordance with at least one embodiment. The document management and collaboration system 302 of FIG. 3 is similar to the document management and collaboration system described with reference to numeral 202 in FIG. 2. A plurality of devices communicate with the document management and collaboration system 302 over a network (not shown), whereby the plurality of devices include a first device 310 pertaining to a first user and a first device 312 and a second device 314 pertaining to a second user. The first device 312 and the second device 314 of the second user are collectively referred to herein as second user devices 312, 314.

The first user may seek to grant the second user access to a document 316 retained by the document management and collaboration system 302. The request may be sent from the first device 310 to the document management and collaboration system 302. The request may be an API function call as described herein. Further, the first user may make the request by logging on to their account with the document management and collaboration system 302. Once the first user is logged in, a user interface, such as a portal, may be shown to the first user and the first user may select, via the user interface, an option indicating that the document 316 is to be shared with the second user. Further, the first user may specify the level of access privilege to be given to the second user. For example, per the request, the second user may be permitted to view or edit the document 316 as retained by the document management and collaboration system 302. Further, the second user may be permitted to download a copy of the document 316 to their own device.

The document management and collaboration system 302 may notify the second user of the access privilege granted to the second user. Notifying the second user may include sending an email to an email address of the second user, whereby the email may include a unique uniform resource locator (URL) link for accessing the document 316. In addition, the second user may be notified upon logging in to their account with the document management and collaboration system 302. The second user may access the document 316 upon being authenticated by the document management and collaboration system 302, for example, by logging on to their account with the document management and collaboration system 302. For example, upon authentication, the second user may view of edit the document 316.

An additional level of authentication may be required for certain types of access to the document 316. For example, if the access privilege specifies that the second user may obtain a copy of the document 316, the document 316 may sought to be protected while in possession of the second user and stored on a device of the second user. Further authentication mechanisms may be employed to ensure that access to the document 316 is given to the intended user.

As shown in FIG. 3, access credentials for the document 316 are sent out-of-band to the second user and independent of the notification of the granted access. Sending the access credentials out-of-band in relation to the notification may include sending the access credentials as a short message service (SMS) message to a phone number of the second user. In addition, an out-of-band transmission of the access credentials may include calling the phone number and providing a voice message specifying the access credentials or initiating a video conference or a video chat. Furthermore, out-of-band transmission of the access credentials may include sending the access credentials to a different email address than that used for sending the notification or to the same email address but in a separate message. An out-of-band transmission of the access credentials may generally include sending the access credentials using a different communication channel or data path than that used for sending the notification.

After receiving access credentials, the second user may utilize the access credentials for accessing the document 316. For example, if the second user is logged on to their account with the document management and collaboration system 302, the second user may be required to provide the access credentials in order to be able to download the document 316 to their device. The second user may manually key-in the access credentials using the first device 312 of the second user. In addition, the access credentials may be provided as a quick response (QR) code or a bar code, among others, that is capable being scanned for facilitating entry of access credentials.

In an embodiment, upon receiving a request for access using the access credentials, the document management and collaboration system 302 may query the first device 312 to request one or more attributes from the first device 312. The one or more attributes may be associated with the first device 312 or the device's environment (for example, a location of the device). Access to the document 316 may be dependent upon the one or more attributes meeting one or more conditions or falling within one or more defined categories. For example, the geographic location of the first device 312 as measured by a global positioning system (GPS) may be used to evaluate whether access may be granted if a geographic restriction on access to the document 316 is imposed. Further, time restrictions may be imposed, whereby, for example, access to the document may only be granted within a particular time of day or a particular day of the week.

Figure 4:
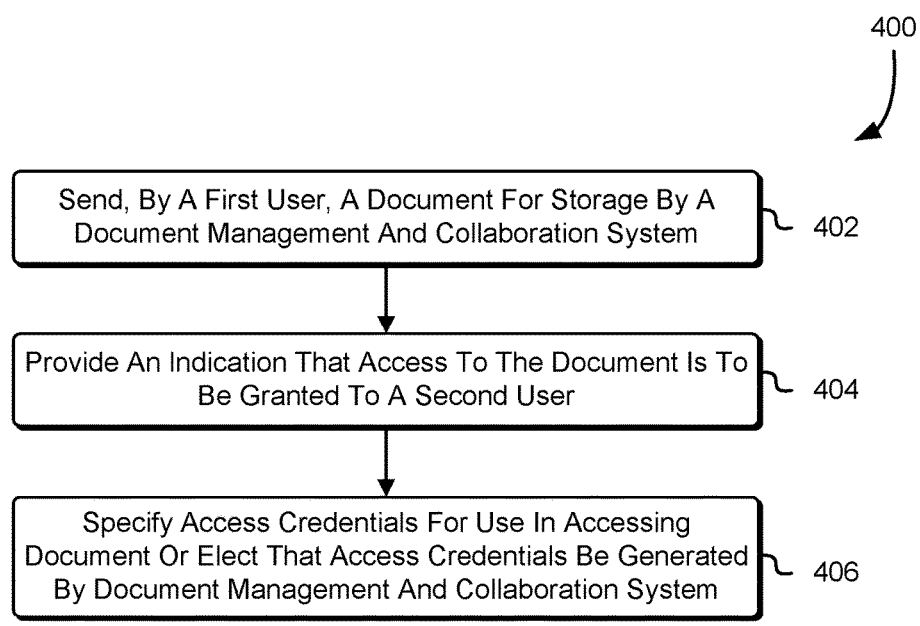
FIG. 4 shows an example of a method for sharing a document stored by a document management and collaboration system in accordance with at least one embodiment.

FIG. 4 shows an example of a method for sharing a document stored by a document management and collaboration system in accordance with at least one embodiment. In the process 400, a first user sends 402 a document for storage by a document management and collaboration system. As described herein, the document may be any type of media, such as audio-visual media. In addition, the document may be computer file that is capable of being rendered by a standard productivity suite as described herein. Further, the document management and collaboration system may be a remote system accessible by a device of the first user via a network. The remote storage of the document permits various users in different geographical locations to collaborate on documents and collectively edit and modify the documents.

The first user provides 404 an indication that access to the document is to be granted to a second user. The first user may log on to their account with the document management and collaboration system to upload the document and may be given the choice to designate a user or a group of users with whom the document is to be shared. In addition, the first user may select a level of access that is to be granted to the second user, whereby the level of access may permit the second user to view, edit or download the document, among others.

The first user then specifies 406 the access credentials for use by the second user in accessing document or elect that access credentials be generated by the document management and collaboration system. For example, the first user may provide a string of symbols for use in authenticating the second user. Alternatively, the first user may be given the choice of having the document management and collaboration system generate the access credentials on behalf of the second user. The access credentials may be retained by an entity of the document management and collaboration system, such as the authentication entity described herein. In addition, the access credentials may be provided to the second user, whereby the second user may be authenticated for access to the document based at least in part on the access credentials.

Figure 5:
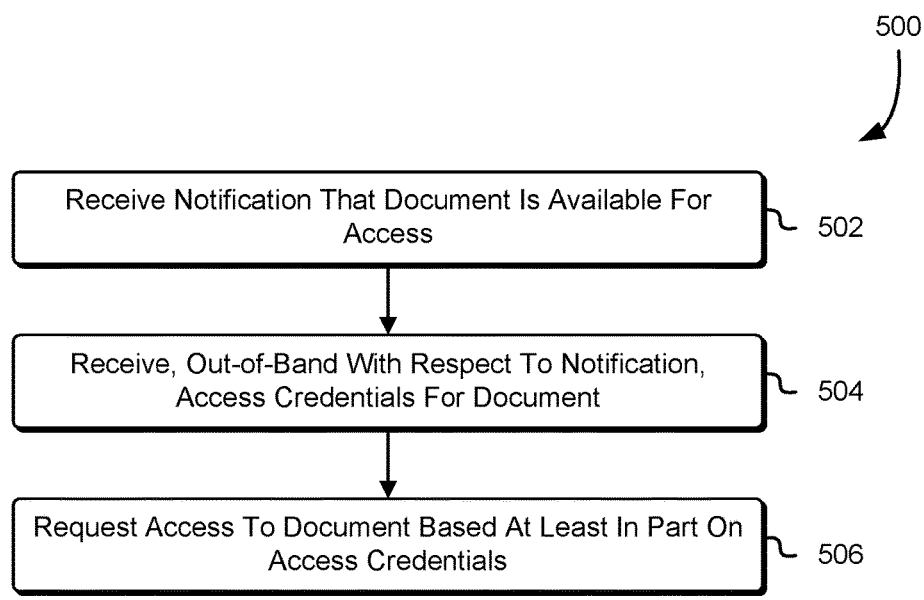
FIG. 5 shows an example of a method for accessing a document retained by a document management and collaboration system in accordance with at least one embodiment.

FIG. 5 shows an example of a method for accessing a document retained by a document management and collaboration system in accordance with at least one embodiment. In the process 500, a user receives 502 a notification that document is available for access. The notification may be provided to the user upon logging in to the document management and collaboration system. Further, the notification may be sent to the user in an email message or a text message, among others, whereby the notification may include a URL directing the user to the document. The document management and collaboration system may send the notification to the user automatically and without human intervention. For example, the notification may be provided in response receiving a request to share the document from another user, whereby receipt of the request may be a trigger for providing the indication.

The user also receives 504 access credentials for the document, whereby the access credentials may be received out-of-band with respect to the notification. For example, if the notification is provided to the user upon logging in to the document management and collaboration system, the access credentials may be sent to the user in an email message or a text message. Furthermore, if the notification is sent to the user in an email message, the access credentials may be sent to the user in a text message or in an email message that is sent to a different account that the email message including the notification. As described herein, an out-of-band message may be sent to a different address associated with the user or a different device of the user, among others. The out-of-band notification is advantageous in that it distributes information necessary for document access over more than one account or device.

Accordingly, if the account or device of the user is compromised or illegitimately accessed, the document is prevented from being illegitimately accessed. Similar to providing the notification, the document management and collaboration system may send the access credentials for the document automatically and without human intervention. The access credentials may be provided in response receiving a request to share the document or in response to sending the notification. As described herein, the document management and collaboration system may be configured to send the access credentials due at least in part to the occurrence of a trigger. The access credentials may be document-specific or they may be usable to access more than one document (for example, a group of documents in a folder or all documents pertaining to an organization).

The user then requests 506 access to the document based at least in part on the access credentials. The access credentials may be required for certain types of access requested by the user. For example, viewing or editing the document that is retained by the document management and collaboration system may only require that the user log on to their account with the document management and collaboration system. However, the access credentials may be required to be authenticated in order for the user to obtain a copy of the document and store the copy on a device of the user. The document management and collaboration system may be configured to provide an option (for example, to organization administrators) that is used to specify the type of authentication required for granting document access. For example, some documents may be publicly available, whereas others may only require authenticating log-in information to the document management and collaboration system to grant access.

Furthermore, the type of authentication may depend upon the type of requested access as described herein. In addition, active content associated with the document may specify that the document is to be tied to the user device and may only be capable of being stored on the user device. Further, the active content may be configured to cause the document to become subject to remote deletion by the document management and collaboration system. Further, a user may be notified of a status of access to the document. The status may specify the availability of the document for access. For example, the user may be notified if they are denied access to the document or blocked from accessing the document based at least in part on authenticating a request for access.

Figure 6:
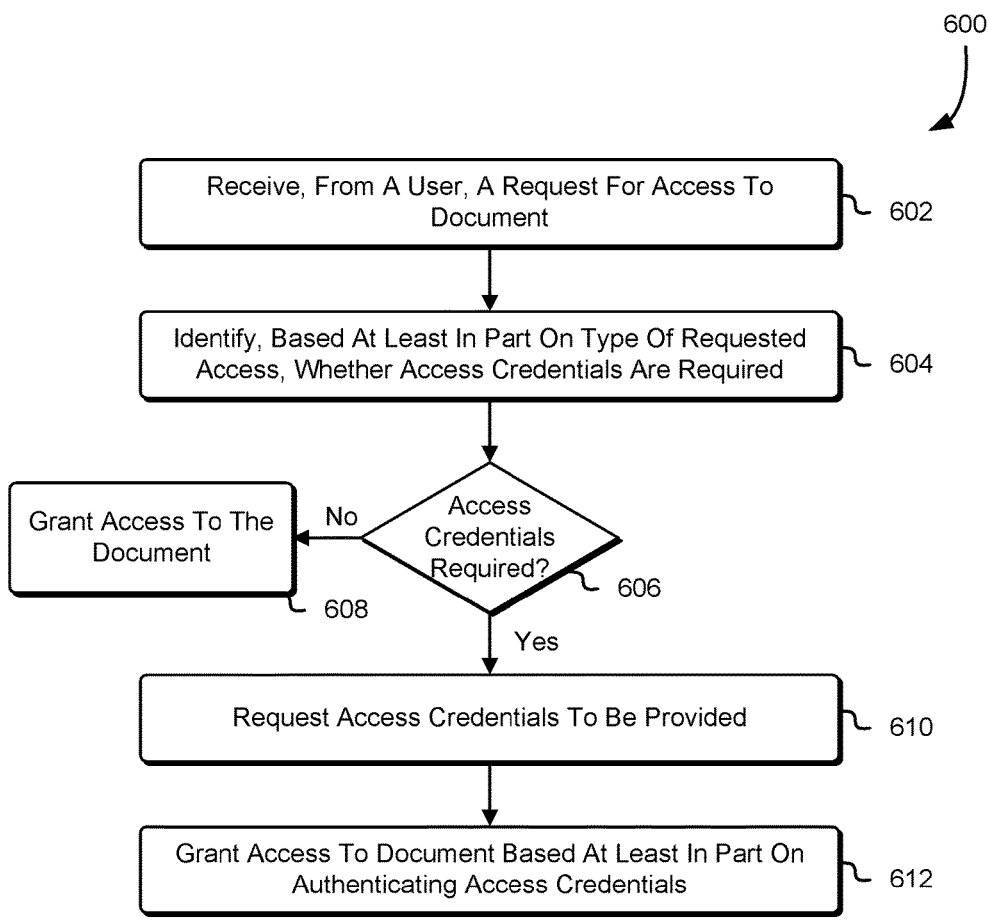
FIG. 6 shows an example of a method for determining whether to grant access to a document based at least in part on a type of requested access in accordance with at least one embodiment.

FIG. 6 shows an example of a method for determining whether to grant access to a document based at least in part on a type of requested access in accordance with at least one embodiment. In the process 600, a document management and collaboration system or an entity thereof, such as the access control entity described with reference to numeral 206 in FIG. 2, receives 602 from a user a request for access to a document. The document management and collaboration system identifies 604 based at least in part on a type of requested access whether access credentials are required to be authenticated for access to be granted. If a negative determination 606 is made, the document management and collaboration system grants 608 access to the document. However, if a positive determination 606 is made, the document management and collaboration system requests 610 that access credentials for the document be provided. Following receiving the access credentials, the document management and collaboration system grants 612 access to document based at least in part on authenticating a request for access to the document including the access credentials. In various embodiments, the document management and collaboration system may identify the user and determine based at least in part on the identity whether to grant access to the document. In other embodiments, the user may not be identified to the document management and collaboration system and the fact that the user's identity is not known may be used to evaluate whether to grant access to the document. For example, a policy may specify whether access may be granted based at least in part on whether the user is identified by the document management and collaboration system.

The user may access the document by downloading the document to a device associated with the user, whereby the document may be stored on the device. Following downloading the document, access credentials may be required for accessing the document. For example, the document may be encrypted and the access credentials may enable decrypting the document. In addition, the document may be configured with a certificate (for example, that is part of a wrapper of the document), whereby the certificate may access the document management and collaboration system over a network for authenticating the access credentials. Standard productivity suites, such as Adobe™ Acrobat™, among others, may be configured with password protection features, whereby access to the documents may be only be provided if a correct password is provided. In addition, the user device storing the document may be configured with a synchronization client, which may be an application or a program, among others. The synchronization client may be configured to communicate with the document management and collaboration system. For example, the synchronization client may request authentication of access credentials or access credentials rotation, among others.

Access credentials may be rotated, whereby issued access credentials may be expired or new access credentials may be provided for use. The access credentials may be expired by the document management and collaboration system upon expiration of a time limit associated with the access credentials. For example, the access credentials may be valid for a day, a week or another time period prior to being expired. In addition, the access credentials may be generational, whereby the access credentials may belong to a particular generation (for example, that has a generation identifier) and the access credentials may become expired upon expiring the particular generation of access credentials. Furthermore, if new access credentials are requested by an authenticated user, the access credentials may be rotated. If the access credentials are expired, the document management and collaboration system may notify the user, for example, by sending a notification of the expiration to an address associated with the user or by providing the indication upon log-in.

Figure 7:
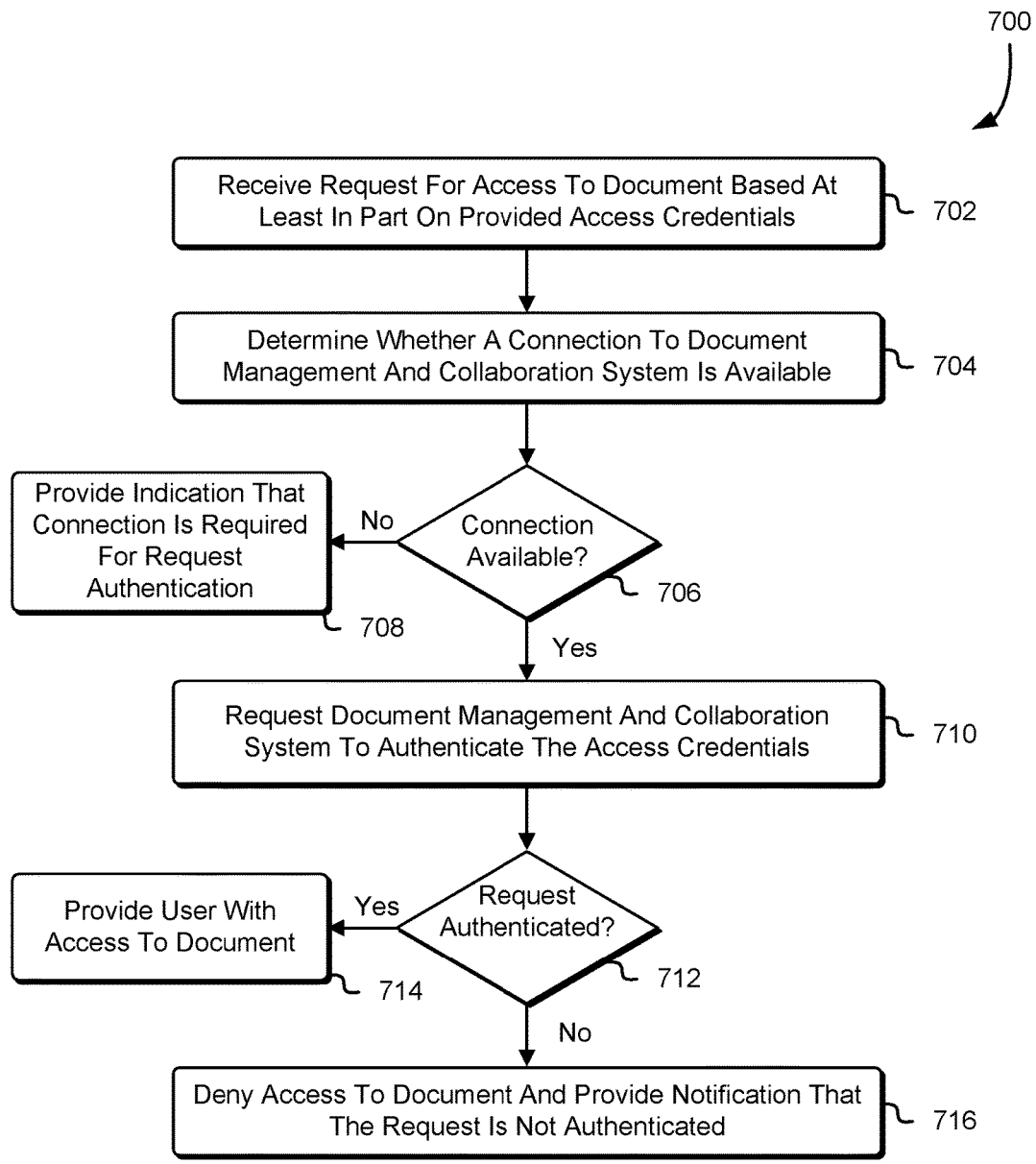
FIG. 7 shows an example of a method for accessing a document stored on a user device in accordance with at least one embodiment.

FIG. 7 shows an example of a method for accessing a document stored on a user device in accordance with at least one embodiment. In the process 700, an entity, such as a synchronization client or productivity suite compliant with the document's native format, receives 702 a request for access to the document based at least in part on provided access credentials. The entity determines 704 whether a connection to the document management and collaboration system is available, whereby if the connection is available, the access credentials may be provided for authentication by the document management and collaboration system. A connection may be a data link that enables the entity to send requests to and receive responses from the document management and collaboration system. For example, a connection may be determined to be available if the entity may access a network that is also accessed by the document management and collaboration system. If a negative determination 706 is made, the entity provides 708 an indication that connection is required for request authentication. The indication may be provided to the user, and the user may connect the device to the network to facilitate the authentication. Active content associated with the document may be used to specify that one or more actions are to be taken based at least in part on a failure to establish the connection. For example, deletion from a user device or self-destruction may be configured.

If a positive determination 706 is made, the entity requests 710 the document management and collaboration system to authenticate the access credentials. If a determination 712 is made that the access credentials are authenticated by the document management and collaboration system, the entity provides 714 the user with access to the document. If, on the other hand, a determination 712 is made that the access credentials are not authenticated by the document management and collaboration system, the entity denies 716 user access to the document and provides a notification that the request is not authenticated. In addition to denying access to the document, one or more other actions may be taken, such as deletion of the document (for example, by an application that enables rendering the document). Further, the one or more other actions may be taken in response to expiration of the access credentials or receiving a notification to that effect. An administrative option (for example, that is part of an organization policy) may specify a type of action to be taken in response to a triggering event. The triggering event may be access credential expiration, failure to authenticate access credentials, failure to communicate with the document management and collaboration system or failure to connect to a network, among others. Further, the one or more actions that may be taken in response to the trigger may include self-destruction or deletion of the document or rotating access credentials, among others.

A document that is provided by the document management and collaboration system may include or may be associated with active content. The active content may be instructions or metadata that are capable of being evaluated by an application that renders the document, such as a word processing application. The active content may be used to facilitate secure access to the document and provide an enhanced user experience. For example, the active content may specify that a document is only accessible if access credentials are authenticated, whereby the access credentials may be authenticated locally or remotely by the document management and collaboration system. In addition, the active content may be used to configure an application used for rendering the document for providing service options to a user. The user may utilize the application for requesting updated access credentials (for example, a new password) upon a failure to authenticate the user-provided access credentials.

In various embodiments, a locally-stored document may have an associated time-bound limited-term certificate that enables access to the document in the absence of connectivity to the document management and collaboration system. The certificate may enable, upon authentication, offline access to the document, such as read-only or non-copy, even if a connection to the document management and collaboration system is not available. The certificate may be valid for a specified period of time upon the expiration of which access to the document may only be provided if a connection to the document management and collaboration system is available.

Figure 8:
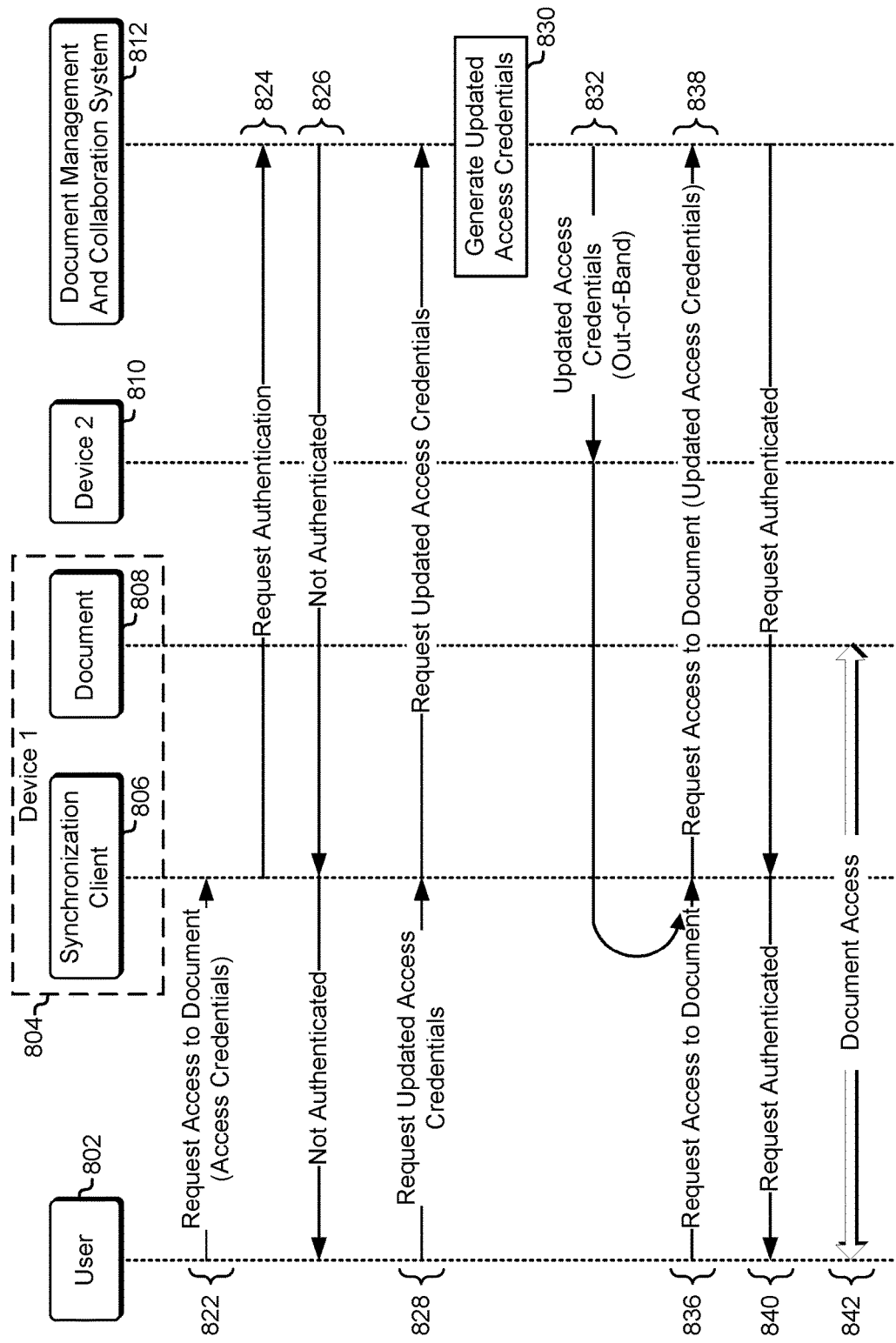
FIG. 8 shows an example of a message flow diagram for updating access credentials for a document in accordance with at least one embodiment.

FIG. 8 shows an example of a message flow diagram for updating access credentials for a document in accordance with at least one embodiment. A user 802 has a first user device (denoted as device 1 in FIG. 8 and referred to herein by the numeral 804) and a second user device (denoted as device 2 in FIG. 8 and referred to herein by the numeral 810). The user devices (referred to collectively herein as user devices 804, 810) may be any type of devices that are capable of communicating with the document management and collaboration system 812. Examples of the user devices include consumer electronics devices, such as desktop computers, laptop computers, smartphones and tablets. A document 808 has been downloaded and stored on the first user device. The document 808 may have any type of computer file format. For example, the document may be a portable document format (pdf) document that is capable of being rendered using Adobe™ Acrobat™ or word processing document that is capable of being rendered using a variety or word processing applications. A synchronization client 806 is executed on the first device 804. The synchronization client 806 may be any type of application that is capable of communicating with the document management and collaboration system 812. The synchronization client 806 may be a proprietary application that is provided by the document management and collaboration system 812 and used for communicating with the document management and collaboration system 812 and the authentication of requests for access to the document 808. In addition, the synchronization client 806 may be used to render the document 808, for example, for viewing on a user device. In various embodiments, the synchronization client 806 may be part of an application used to render the document 808, such as a standard productivity application including Adobe™ Acrobat™ and Microsoft® Office. The synchronization client 806 or the productivity application may be configured with an API library used to communicate with the document management and collaboration system 812 and enforce configured access restrictions. Further, the synchronization client 806 may evaluate the document 808 or associated active content or metadata, such as that included in a file wrapper of the document 808, to determine whether the document is protected. In addition, if the document 808 is determined to be protected, the synchronization client 806 may only permit access to the document 808 that is compliant with the access restrictions. The synchronization client 806 may be used to ensure that the document 808, which may have been previously downloaded from the document management and collaboration system 812, is only accessible on the first device 804 if current access credentials are provided.

The user 802 submits 822 a request to the first device 804 to access the document 808. The user 802 may be prompted to supply the access credentials and in response, the user 802 supplies the access credentials for the document 808. The user 802 may provide the access credentials by manually entering the access credentials using a keyboard or a touchpad of the first device 804. Furthermore, if the access credentials were provided to the user as a QR code or a bar code, the user may utilize a camera or a scanner of the first device 804 to scan the QR code or bar code, for example, as displayed on a screen of the second device 810. Furthermore, if received out-of-band on the second device 810, the access credentials may be automatically transmitted from the second device 810 to the first device 804. For example, an application executed on the second device 810 may utilized to transmit the access credentials to the first device using any wired or wireless communications protocol, such as Bluetooth or infrared (IR), among others.

Upon receiving the access credentials, the synchronization client 806 may be configured to cause the request to be authenticated based at least in part on the access credentials. The synchronization client 806 sends 824 a request to the document management and collaboration system 812 to authenticate the request. The Authentication may fail due at least in part to the fact that the access credentials were incorrectly entered. Further, the access credentials may have expired, been rotated or may have been updated and superseded by updated access credentials. The document management and collaboration system 812 sends 826 a message to the synchronization client 806 indicating that the access credentials were not authenticated and the synchronization client 806 conveys the message to the user, for example, by displaying a message indicating that the authentication has failed. It is noted that in alternative embodiments, the synchronization client 806 may be configured to receive the updated access credentials for documents stored on the first device 804. The synchronization client 806 may cause the access credentials to be authenticated independently and without the need to request the authentication to be done by the document management and collaboration system 812. The current access credentials or an outcome of a function thereof (such as an outcome of a hash function) may be stored locally on the first device 804 (for example, separately and independently of the document) and may be used to authenticate requests for access. If the received access credentials correspond to the stored access credentials or if an outcome of the function applied to the received access credentials corresponds (for example, matches) the stored outcome, the request for access may be authenticated.

The user may seek to receive updated access credentials or have the credentials changed (for example, in the event that the access credentials are lost or misplaced). The user requests 828 updated access credentials in response to being presented with the option. Active content associated with the document may be configured to enable requesting new access credentials. For example, upon attempting to access the document, an option may be provided to request that the access credentials be rotated and that new access credentials be provided. The synchronization client 806 or an application executed on the first device 804, such as a word processing application, may be configured to evaluate the active content and provide a user with an option to request updated access credentials. The synchronization client 806 forwards 828 the request to the document management and collaboration system 812. The document management and collaboration system 812, in turn, generates 830 updated access credentials. To protect the document from illegitimate access by an unauthorized party, the document management and collaboration system 812 sends 832 the updated access credentials to the user out-of-band as described herein. The updated access credentials are shown as being sent to the second device 810 of the user as opposed to the first device 804 used to access the document 808. In response to receiving the updated access credentials, the user 802 requests 836 access to the document based at least in part on the updated access credentials. The synchronization client 806 communicates 838 with the document management and collaboration system 812 to cause the request to be authenticated 840 based at least in part on the updated access credentials. Upon authentication of the request, the synchronization client 806 then permits access 842 to the document 808.

The techniques described herein enable authenticated access to documents automatically and without human intervention. For example, a user who shares a document may not need to have an active role in managing access to the document or safekeeping the access credentials. Instead, the document management and collaboration system may automatically rotate or update access credentials. A document management and collaboration system configured with secure document sharing features described herein ensures safekeeping of documents as the availability of the features encourages users to utilize practices. Therefore, rather than share documents in an unsecure manner due to the fact that secure sharing is too cumbersome, users are more likely to adopt secure practices when enabled automatically by the document management and collaboration system.

Figure 9:
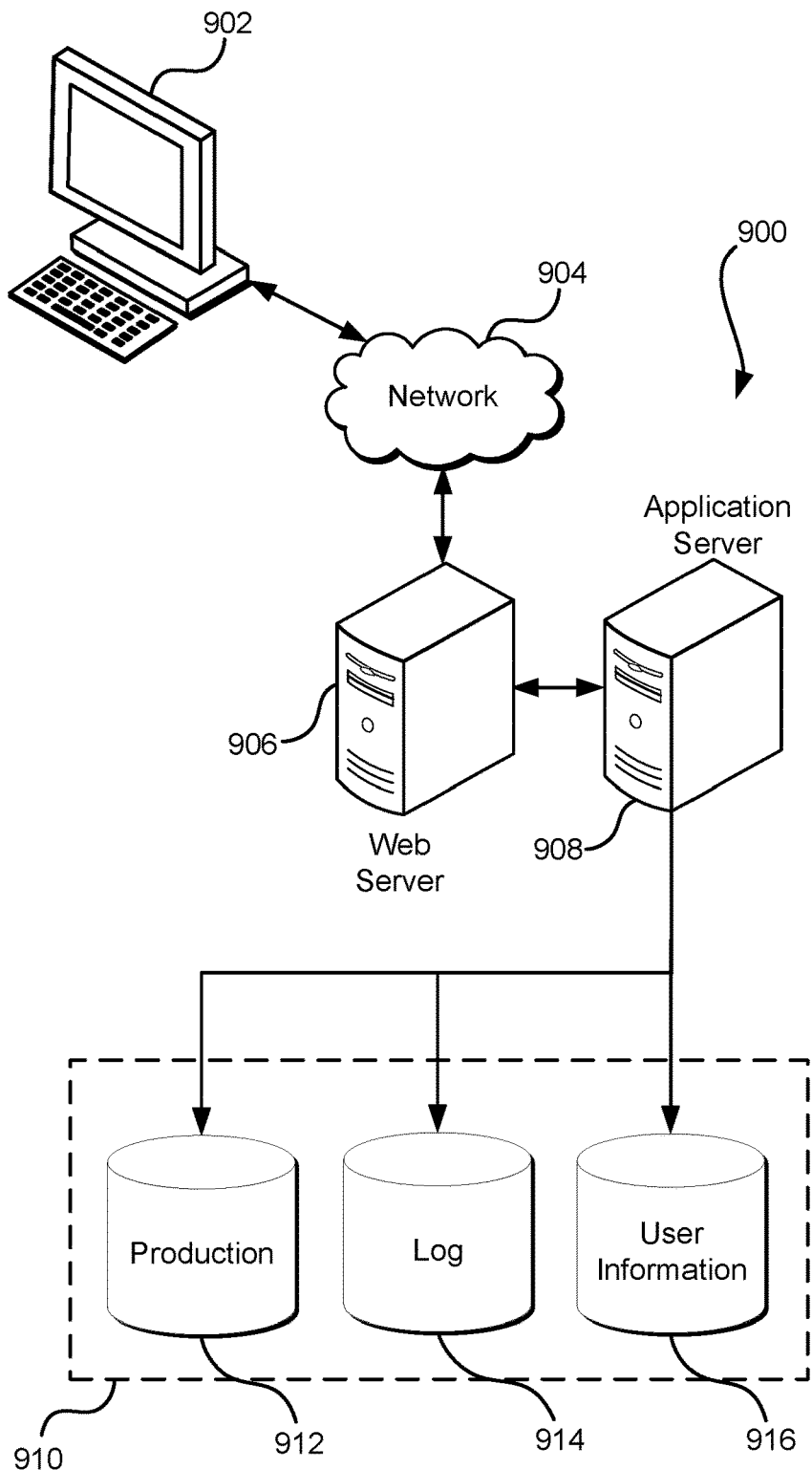
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a first request to provide a user access to a document managed by a document management and collaboration system; and
    providing the user with access to the document by at least:
        transmitting a notification to a first user device associated with the user indicating access to the document has been provided;
        receiving a second request to access the document;
        making out-of-band access credentials available to a second user device in response to the second request based at least in part on a login credential associated with the second request provided to the document management and collaboration system;
        obtaining the out-of-band access credentials from the first user device; and
        providing access to the document by at least:
            obtaining the out-of-band access credentials from the first user device; and
            determining a confidence score of the out-of-band access credentials, the confidence score determined based at least in part on a number of independent authentication factors including at least the login credential and one or more attributes of the second user device.

2. The computer-implemented method of claim 1, the first request further includes a level of access privilege to be provided to the user.

3. The computer-implemented method of claim 1, wherein the level of access privilege indicates the user can download the document.

4. The computer-implemented method of claim 1, wherein the level of access privilege indicates the user can view and annotate the document.

5. The computer-implemented method of claim 1, wherein the one or more attributes of the second user device are obtained along with the login credentials.

6. The computer-implemented method of claim 1, wherein making the out-of-band access credentials available to the second user device further comprises transmitting the out-of-band access credentials based at least in part on information associated with the login credentials maintained by the document management and collaboration system.

7. A system, comprising:
    one or more processors; and
    memory that stores computer-executable instructions that, if executed, cause the system to:
        receive a first request to provide access to a document of a document management and collaboration system;
        provide a notification to a first computing device as a result of the first request;
        receive an access request from the first computing device;
        make access credentials, for accessing the document, available to a second computing device;
        receive the access credentials from the first computing device;

obtain information indicating one or more attributes of the second computing device prior to providing the second computing device with the access credentials; and provide access to the document based at least in part on a plurality of authentication factors including at least the one or more attributes of the second computing device.

8. The system of claim 7, wherein the access credentials are provided out-of-band in relation to the access request.

9. The system of claim 7, wherein the first request is associated with a first user of the document management and collaboration system and the access request is associated with a second user of the document management and collaboration system.

10. The system of claim 7, wherein the access request includes a uniform resource locator usable to access the document.

11. The system of claim 7, wherein the first request includes an access level associated with the document.

12. The system of claim 11, wherein the memory further includes computer-executable instructions that, if executed, cause the system to:

determine a confidence interval based at least in part on a number of authentication factors performed to authenticate the access request; and modify the access level based at least in part on the confidence interval.

13. The system of claim 7, wherein obtaining the information indicating the one or more attributes of the second computing device further includes obtaining the information from data included in the access credentials.

14. A non-transitory computer-readable storage medium having stored thereon executable instructions that, if executed by one or more processors of a computer system, cause the computer system to at least:

receive, from a first computing device, a request to access a document of a document management and collaboration system;

in response to the request, make an access token available to a second computing device;

determine a score based at least in part on a plurality of independent authentication factors including at least a set of access tokens and one or more attributes obtained from the second computing device; and provide access to the document, as a result of the score satisfying a set of conditions, and by obtaining, from the first computing device, the access token.

15. The non-transitory computer-readable storage medium of claim 14, wherein the instructions that cause the computer system to make the access token available to the second computing device further include instructions that, if executed by the one or more processors, cause the computer system to transmit a short message service (SMS) message to the second computing device.

16. The non-transitory computer-readable storage medium of claim 14, wherein the instructions that cause the computer system to make the access token available to the second computing device further include instructions that, if executed by the one or more processors, cause the computer system to provide a voice message specifying the access credentials to the second computing device.

17. The non-transitory computer-readable storage medium of claim 14, wherein the instructions that cause the computer system to make the access token available to the second computing device further include instructions that, if executed by the one or more processors, cause the computer system to initiate a video conference with the second device and a user associated with the document.

18. The non-transitory computer-readable storage medium of claim 14, wherein the instructions further comprise instructions that, if executed by the one or more processors, cause the computer system to receive a second request from a user associated with the document to make the document available to a second user associated with the first computing device.

19. The non-transitory computer-readable storage medium of claim 18, wherein the instructions that cause the computer system to make the access token available to the second computing device further include instructions that, if executed by the one or more processors, cause the computer system to determine the second computing device to provide the access token based at least in part on the second user registering the second computing device as an authentication device with the document management and collaboration system.

20. The non-transitory computer-readable storage medium of claim 14, wherein the instructions that cause the computer system to provide access to the document further include instructions that, if executed by the one or more processors, cause the computer system to obtain authentication credentials associated with the first computing device in addition to the access token.

* * * * *